Feb. 25, 1941.                J. A. BREWER                 2,233,338
                                 FISHHOOK
                            Filed Nov. 16, 1939
Fig. 1.                                      Fig. 2.
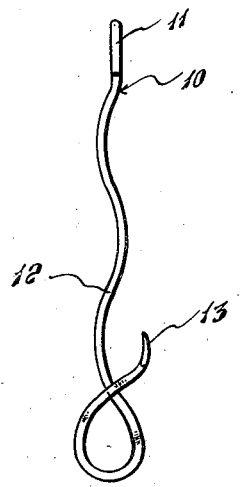
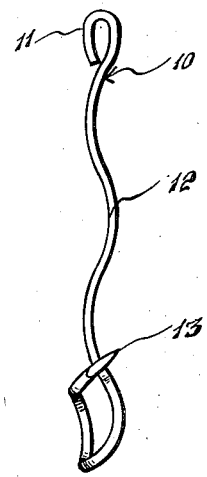
Fig. 3.                                      Fig. 4.
              Fig. 5.
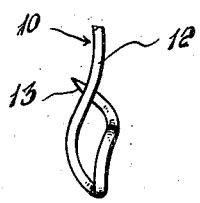
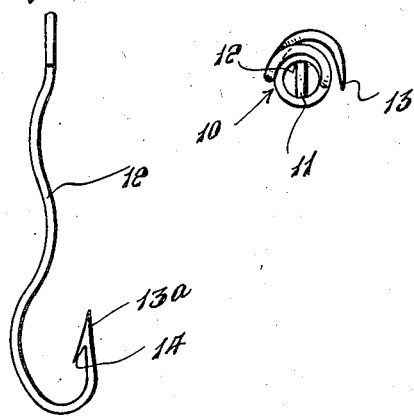
Inventor
John A. Brewer
By L. F. Randolph
Attorney Patented Feb. 25, 1941

2,233,338

UNITED STATES PATENT OFFICE 2,233,338

FISHHOOK

John A. Brewer, Kalamazoo, Mich.

Application November 16, 1939, Serial No. 304,830

2 Claims. (Cl. 43—27)

This invention relates to a fishhook and it aims to provide a construction wherein the hook substantially throughout its length and at least adjacent and above the free end of the hook proper is sinuous, wavy or the like in order to cause the hook to turn in the event it enters and contacts the lips of fish or the body of a fish should contact the hook, greatly aiding in catching fish by "snagging."

I also aim to provide the sinuous construction referred to as it enables me to dispense with a barb at the free end of the hook, although in some instances the barb is used.

The sinuous construction referred to will cause the hook to turn about its generally longitudinal axis when contacting any part of a fish, the shape of the hook provides a more secure hold for bait and even for caught fish, and it gives a more wormy or natural appearance to worms which are threaded on the hook.

The more specific objects and advantages will become apparent from a consideration of the description following taken in connection with accompanying drawing illustrating operative embodiments thereof.

In said drawing—

Figure 1 is a view of the hook in side elevation;

Figure 2 is a view of the hook in side elevation taken at a right angle to Figure 1;

Figure 3 is a fragmentary elevation of the lower end of the hook taken 180° to Figure 2;

Figure 4 is a plan view of the hook, and

Figure 5 is an elevation of a modified form.

Referring first to the form of Figures 1 to 4, the hook is preferably made as usual from a single strand of wire 10 properly tempered or treated, having an eyelet 11 at its upper end so that it may be attached to a fishing line. Below the eyelet 11, the wire or shank is sinuous, wavy or helical throughout as shown, the waves being designated 12. At the lower end of the wire or shank 10, the same is returned upwardly toward the eyelet 11, but with the waves 12 thereof spaced from and out of contact with any other part of the shank or wire 10 and terminating in a sharpened hook 13. It will be noted in Figures 1 to 4 that a barb is avoided on the hook 13 as I find that it is unnecessary. At the same time, one may be used if desired.

Figure 5 shows the same hook as Figures 1 and 2 but with the addition of a barb as at 14 on the hook 13a thereof.

The improved hooks may be used like the ordinary hooks, suspended from a fishing line, and the worm or bait is attached to the hook 13 or 13a. When the worm or bait is threaded along the hook, it will assume the sinuous form of the hook and thus provide a more natural appearance which is advantageous from a baiting standpoint and it will be more securely held on the hook.

When the hook 13 enters the mouth of a fish or any part of the body of a fish contacts the hook 13 or any of the waves 12, it will tend to rotate the hook on its longitudinal axis, greatly facilitating penetration of the point 13 or 13a into the fish if actually hooked on the part 13 or 13a or if unhooked, so that the "snagging" effect of the hook will be greatly enhanced.

Various changes may be resorted to provided they fall within the spirit and scope of the invention.

I claim as my invention:

1. A fishing hook structure generally of hook shape, the body of the structure opposite to the fish-hooking portion thereof being sinuous, said fish-hooking portion being arcuate around the longitudinal axis of the hook.

2. A fishing hook structure of the class described having a portion conforming generally to the shape of the numeral 8, the crossing parts of said portion and free end thereof being out of contact with the remainder of the hook, said free end being arcuate around the longitudinal axis of the hook, said remainder of the hook extending above said free end, and being sinuous.

JOHN A. BREWER.